United States Patent
Ellam

Patent No.: US 6,330,752 B1
Date of Patent: Dec. 18, 2001

(54) ADJUSTABLE SQUARING TOOL

(76) Inventor: Albert F. Ellam, 13 Vermont House, 2 East Road, Walthamstow, London E17 5NY (GB)

(*) Notice: Subject to any disclaimer, the term of this patent is extended or adjusted under 35 U.S.C. 154(b) by 0 days.

(21) Appl. No.: 09/497,904
(22) Filed: Feb. 4, 2000
(51) Int. Cl.$^7$ ................................................. B43L 13/00
(52) U.S. Cl. .............................. 33/471; 33/498; 33/465; 33/424; 403/93; 403/95
(58) Field of Search ............................. 33/498, 471, 452, 33/465, 496, 497, 418, 495, 499, 500, 424, 426, 468, 469; 403/92, 93, 95

(56) References Cited

U.S. PATENT DOCUMENTS

| D. 262,195 | 12/1981 | Koontz. | |
| 362,354 | * 5/1887 | Boisen | 33/499 |
| 558,383 | * 4/1896 | Grim | 33/332 |
| 792,469 | * 6/1905 | Seibert | 33/499 |
| 901,113 | * 10/1908 | Losch | 33/498 |
| 1,023,738 | * 4/1912 | Hill | 33/499 |
| 2,247,327 | * 6/1941 | Brady | 33/451 |
| 4,312,133 | 1/1982 | Mima. | |
| 4,394,801 | * 7/1983 | Thibodeaux | 33/496 |
| 4,446,627 | * 5/1984 | Persson | 33/497 |
| 4,481,720 | * 11/1984 | Sury | 33/451 |
| 4,525,933 | 7/1985 | Patterson. | |
| 4,685,366 | 8/1987 | Beder. | |
| 4,697,351 | 10/1987 | Hopfer. | |
| 4,757,616 | * 7/1988 | Hills | 33/488 |
| 4,881,776 | * 11/1989 | Wang | 297/379 |
| 4,920,658 | * 5/1990 | Hile | 33/499 |
| 5,184,142 | * 2/1993 | Hornburg et al. | 343/715 |
| 5,293,878 | * 3/1994 | Bales et al. | 128/751 |
| 5,419,053 | * 5/1995 | Kathan | 33/417 |
| 5,438,761 | * 8/1995 | Krumszyn et al. | 33/451 |
| 5,515,754 | * 5/1996 | Elkins | 81/177.9 |
| 5,539,991 | 7/1996 | Harrison. | |
| 5,607,173 | * 3/1997 | Lai | 280/293 |
| 6,209,213 | * 4/2001 | Moe | 33/471 |

* cited by examiner

Primary Examiner—Diego Gutierrez
Assistant Examiner—Mirellys Jagan

(57) ABSTRACT

An adjustable squaring tool for measuring and marking angles includes a pivot arm pivotally coupled between first and second sections of a main member. The pivot arm having a graduated arcuate measurement arm extending from the pivot arm through a channel in the main member. The pivot arm having a cylinder coupled to an end of the pivot arm. The main member includes a drum passing through the cylinder. The cylinder has a plurality of radially spaced apertures corresponding to the gradations of the measurement arm. The drum includes at least one spring biased bearing positioned for engaging apertures in the cylinder as the cylinder rotates around the drum. A locking assembly is provided for clamping the pivot arm between the first and second sections of the main member to lock the pivot arm relative to the main member. In an embodiment the apertures are spaced for adjusting the tool in one degree increments between 10 degrees and 90 degrees.

14 Claims, 3 Drawing Sheets

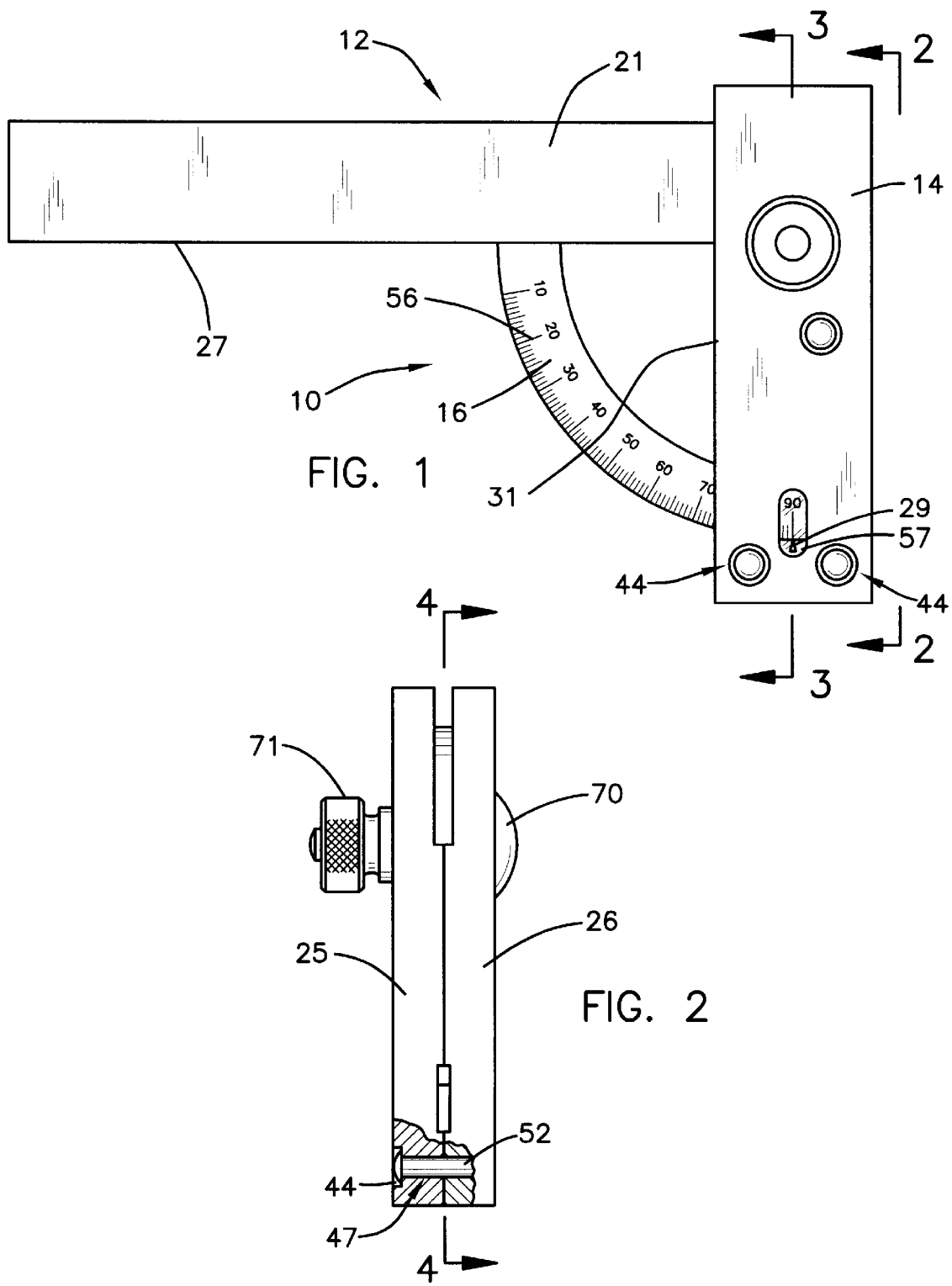

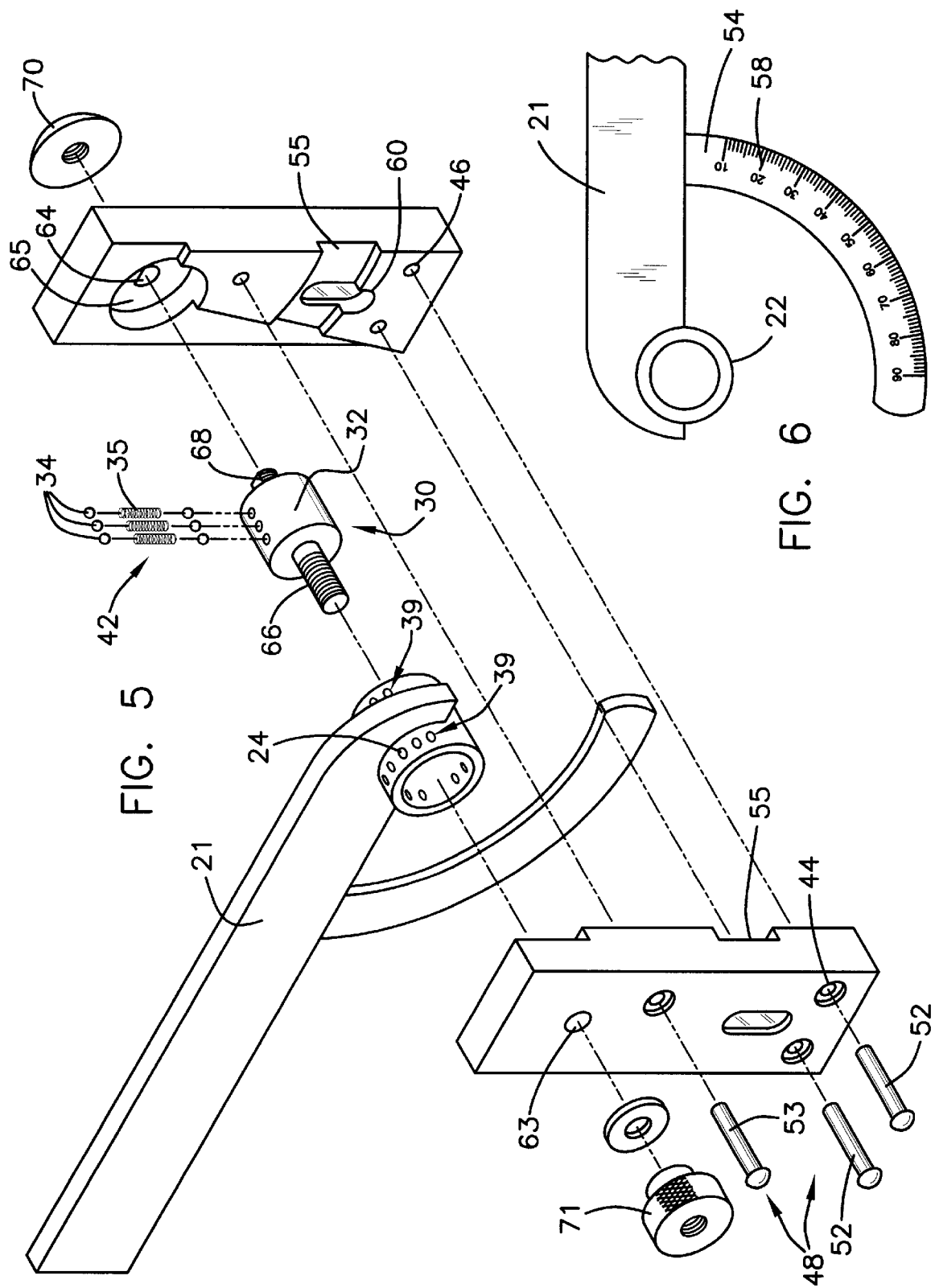

ADJUSTABLE SQUARING TOOL

BACKGROUND OF THE INVENTION

1. Field of the Invention

The present invention relates to squaring tools and more particularly pertains to a new adjustable squaring tool for measuring and marking angles in one degree increments between 10 degrees and 90 degrees.

2. Description of the Prior Art

The use of squaring tools is known in the prior art. More specifically, squaring tools heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,312,133; U.S. Pat. No. 4,697,351; U.S. Pat. No. 4,525,933; U.S. Pat. No. 4,685,366; U.S. Pat. No. 5,539,991; and U.S. Pat. No. Des. 262,195.

While these devices fulfill their respective, particular objectives and requirements, the aforementioned patents do not disclose a new adjustable squaring tool. The inventive device includes a pivot arm pivotally coupled between first and second sections of a main member. The pivot arm having a graduated arcuate measurement arm extending from the pivot arm through a channel in the main member. The pivot arm having a cylinder coupled to an end of the pivot arm. The main member includes a drum passing through the cylinder. The cylinder has a plurality of radially spaced apertures corresponding to the gradations of the measurement arm. The drum includes at least one spring biased bearing positioned for engaging said apertures in the cylinder as the cylinder rotates around the drum. A locking assembly is provided for clamping the pivot arm between the first and second sections of the main member to lock the pivot arm relative to the main member.

In these respects, the adjustable squaring tool according to the present invention substantially departs from the conventional concepts and designs of the prior art, and in so doing provides an apparatus primarily developed for the purpose of measuring and marking angles in one degree increments between 10 degrees and 90 degrees.

SUMMARY OF THE INVENTION

In view of the foregoing disadvantages inherent in the known types of squaring tools now present in the prior art, the present invention provides a new adjustable squaring tool construction wherein the same can be utilized for measuring and marking angles in one degree increments between 10 degrees and 90 degrees.

The general purpose of the present invention, which will be described subsequently in greater detail, is to provide a new adjustable squaring tool apparatus and method which has many of the advantages of the squaring tools mentioned heretofore and many novel features that result in a new adjustable squaring tool which is not anticipated, rendered obvious, suggested, or even implied by any of the prior art squaring tools, either alone or in any combination thereof.

To attain this, the present invention generally comprises a pivot arm pivotally coupled between first and second sections of a main member. The pivot arm having a graduated arcuate measurement arm extending from the pivot arm through a channel in the main member. The pivot arm having a cylinder coupled to an end of the pivot arm. The main member includes a drum passing through the cylinder. The cylinder has a plurality of radially spaced apertures corresponding to the gradations of the measurement arm. The drum includes at least one spring biased bearing positioned for engaging said apertures in the cylinder as the cylinder rotates around the drum. A locking assembly is provided for clamping the pivot arm between the first and second sections of the main member to lock the pivot arm relative to the main member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein arc for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new adjustable squaring tool apparatus and method which has many of the advantages of the squaring tools mentioned heretofore and many novel features that result in a new adjustable squaring tool which is not anticipated, rendered obvious, suggested, or even implied by any of the prior art squaring tools, either alone or in any combination thereof.

It is another object of the present invention to provide a new adjustable squaring tool which may be easily and efficiently manufactured and marketed.

It is a further object of the present invention to provide a new adjustable squaring tool which is of a durable and reliable construction.

An even further object of the present invention is to provide a new adjustable squaring tool which is susceptible of a low cost of manufacture with regard to both materials and labor, and which accordingly is then susceptible of low prices of sale to the consuming public, thereby making such adjustable squaring tool economically available to the buying public.

Still yet another object of the present invention is to provide a new adjustable squaring tool which provides in the apparatuses and methods of the prior art some of the advantages thereof, while simultaneously overcoming some of the disadvantages normally associated therewith.

Still another object of the present invention is to provide a new adjustable squaring tool for measuring and marking angles in one degree increments between 10 degrees and 90 degrees.

Yet another object of the present invention is to provide a new adjustable squaring tool which includes a pivot arm pivotally coupled between first and second sections of a main member. The pivot arm having a graduated arcuate measurement arm extending from the pivot arm through a channel in the main member. The pivot arm having a cylinder coupled to an end of the pivot arm. The main member includes a drum passing through the cylinder. The cylinder has a plurality of radially spaced apertures corresponding to the gradations of the measurement arm. The drum includes at least one spring biased bearing positioned for engaging said apertures in the cylinder as the cylinder rotates around the drum. A locking assembly is provided for clamping the pivot arm between the first and second sections of the main member to lock the pivot arm relative to the main member.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic front view of a new adjustable squaring tool according to the present invention.

FIG. 2 is a schematic side view of the present invention.

FIG. 5 is a schematic exploded perspective view of the present invention.

FIG. 6 is a schematic rear view of the pivot arm and measurement arm of the present invention.

DESCRIPTION OF THE PREFERRED EMBODIMENT

Figure 3:
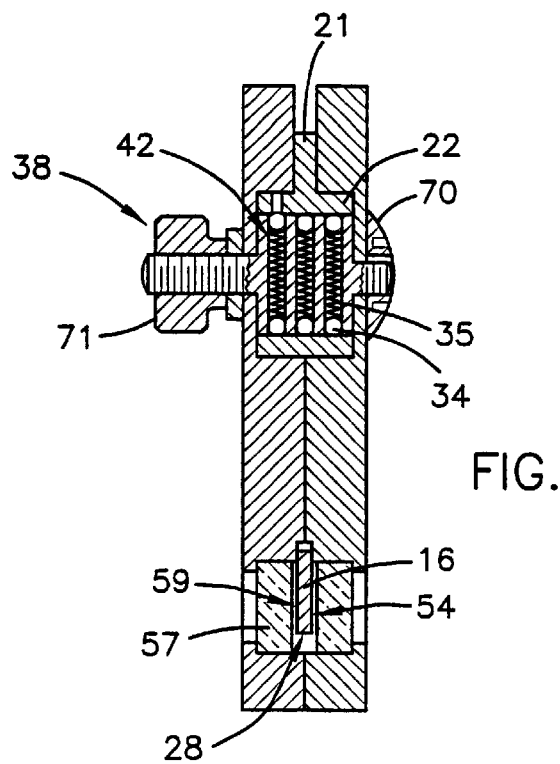
FIG. 3 is a schematic cross-sectional view of the present invention taken along line 3—3 of FIG. 1.
Figure 4:
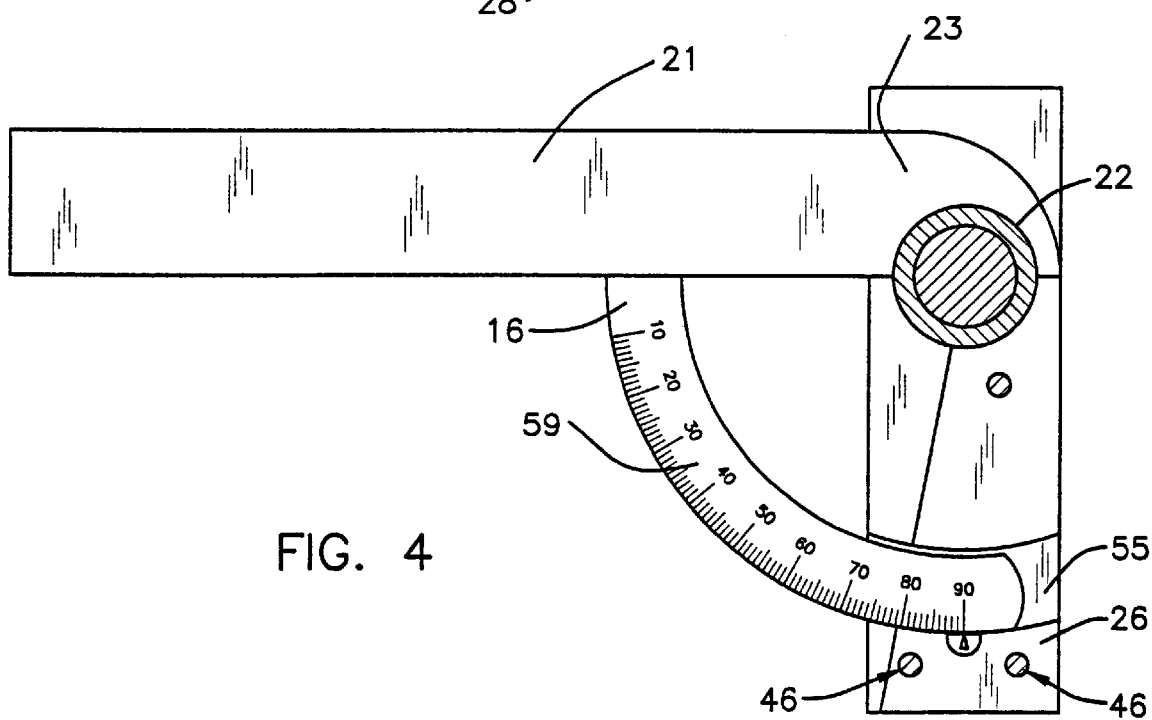
FIG. 4 is a schematic cross-sectional view of the present invention taken along line 4—4 of FIG. 2.

With reference now to the drawings, and in particular to FIGS. 1 through 6 thereof, a new adjustable squaring tool embodying the principles and concepts of the present invention and generally designated by the reference numeral 10 will be described.

As best illustrated in FIGS. 1 through 6, the adjustable squaring tool 10 generally comprises a pivot arm assembly 12, a main member 14 and an arcuate measurement arm 16. The pivot arm assembly includes an elongated pivot arm 21 and a cylinder 29 coupled to an end 23 of the pivot arm. The cylinder includes a plurality of radially spaced apertures 24 spaced in five degree increments.

The main member includes a first section 25 and a second section 26. The pivot arm is pivotally coupled between the first section and the second section of the main member.

The measurement arm is graduated and extends from the pivot arm. The measurement arm extends through a channel 28 in the main member.

A drum assembly 30 is positioned within the main member for engaging and holding the cylinder of the pivot arm in place. The drum assembly includes a drum 32 that passes through the cylinder of the pivot arm. The drum assembly also includes at least one spring biased bearing 34 that extends outwardly from an outer surface of the drum. In an embodiment, bearings may protrude from opposite sides of the drum and include a single spring member 35 for two associated bearings. Each bearing is positioned for engaging a selectable one of the apertures in the cylinder corresponding to a selectable angle between the pivot arm and the main member.

In an embodiment, the apertures in the cylinder are arranged into a plurality of aperture rows 39. The apertures in each row are radially spaced with respect to each other. The drum assembly includes a plurality of the spring biased bearings and each bearing is positioned to engage a selectable one of the apertures in an associated one of the rows of apertures.

In an embodiment, the cylinder includes three rows of apertures and the drum assembly includes three spring loaded bearing member assemblies 42, each having two bearings.

A locking, assembly 38 is provided for clamping the pivot arm between the first and second sections of the main member to prevent movement of the pivot arm relative to the main member during use.

The first section of the main member includes a plurality of first section connection holes 44 and the second section of the main member includes a plurality of second section connection holes 46. The second section connection holes are positioned to align with the first section connection holes to form a plurality of main member holes 47 that extend through the main member. A plurality of connecting members 48 are provided. Each of the connecting members is insertable through an associated one of the main member holes for coupling the first section to the second section. The connection is tight enough to hold the first and second sections together while permitting the measurement arm to rotate relative to the main member. In an embodiment, two pins 52 are provided proximate a end of the main member opposite the cylinder and a third pin 53 is provided proximate the cylinder.

The first and second sections of the main member each include complimentary measurement arm channels 55. The measurement arm channels are positioned adjacent to each other when the first section is coupled to the second section to form the channel 28 through the main member.

The measurement arm includes a first plurality of angle indicators 56 on a first face 59 of the measurement arm. The first section includes a window portion 57 positioned in alignment with the channel in the main member. In use, the angle indicators 56 are visible through the window portion in the first section.

In an embodiment, the measurement arm also includes a second plurality of angle indicators 58 on a second face 54 of the measurement arm. The second section then includes a window portion 60 positioned in alignment with the channel in the main member such that the angle indicators 58 are visible through the window portion 60. The first angle indicators are radially spaced corresponding to one degree increments around the center of the cylinder. In an embodiment, the second angle indicators are also radially spaced corresponding to one degree increments around the center of the cylinder. In an embodiment, the window portions 57 and 60 may be structured to magnify the angle indicators 56 and 58.

The main member includes a pair of locking apertures 63 and 64, each extending through a respective one of the first and second sections. The locking apertures are positioned adjacent an interior drum chamber 65 of the main member.

The drum includes a pair of threaded extensions 66 and 68 that extend from opposite ends of the drum. Each of the threaded extensions passes through an associated one of the locking apertures.

The locking assembly includes a locking nut 70 couplable to one of the threaded extensions and a thumbscrew 71 couplable to another one of the threaded extensions. The thumb screw is tightenable to compress the main member between the thumb screw and the locking nut whereby the measurement arm is frictionally held in a static position relative to the main member when the thumb screw is tightened.

The pivot arm includes a leading edge 27 aligned with a center of the cylinder. The window portion of the first section includes alignment indicia 29 that extends along a longitudinal axis of the main member. The longitudinal axis of the main member also extends through a center of the cylinder such that the individual angle indicator that is visible through the window portion and aligned with the alignment indicia indicates an angle between the leading edge of the pivot arm and the longitudinal axis of the main member. The main member includes a planar first face 31 aligned parallel to the longitudinal axis. In accordance with geometric principles, the angle between the longitudinal axis and the leading edge is equivalent to an angle between the leading edge and the first face of the main member.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An adjustable squaring tool, comprising:
   a pivot arm assembly having an elongated pivot arm and a cylinder coupled to an end of the pivot arm, the cylinder having a plurality of radially spaced apertures;
   a main member, the pivot arm being pivotally coupled between a first section and a second section of the main member;
   a graduated arcuate measurement arm extending from the pivot arm, the measurement arm extending through a channel in the main member;
   a drum assembly having a drum passing through the cylinder of the pivot arm, the drum assembly having at least one spring biased bearing extending outwardly from said drum, said bearing being positioned for engaging a selectable one of said apertures in the cylinder corresponding to a selectable angle between said pivot arm and said main member; and
   a locking assembly for clamping the pivot arm between the first and second sections of the main member to prevent movement of the pivot arm relative to the main member.

2. The adjustable squaring tool of claim 1, further comprising:
   said apertures in said cylinder being arranged into a plurality of rows, said apertures in each row being radially spaced with respect to each other; and
   said drum assembly having a plurality of said spring biased bearings, each bearing being positioned to engage a selectable one of said apertures in an associated one of said rows of apertures.

3. The adjustable squaring tool of claim 2, further comprising:
   said cylinder having three rows of apertures and said drum assembly having three spring loaded bearing members.

4. The adjustable squaring tool of claim 1, further comprising:
   said first section of said main member having a plurality of first section connection holes;
   said second section of said main member having a plurality of second section connection holes, said second section connection holes being positioned to align with said first section connection holes to form a plurality of main member holes extending through the main member; and
   a plurality of connecting members, each of said connecting members being insertable through an associated one of said main member holes for coupling said first section to said second section such that said measurement arm is permitted to rotate relative to said main member.

5. The adjustable squaring tool of claim 1, further comprising:
   said first and second sections of said main member each having complimentary measurement arm channels, said measurement arm channels being positioned adjacent to each other when said first section is coupled to said second section to form said channel through said main member.

6. The adjustable squaring tool of claim 5, further comprising:
   said measurement arm having a first plurality of angle indicators on a first face of said measurement arm;
   said first section having a window portion positioned in alignment with said channel in said main member whereby said first plurality of angle indicators are visible through said window portion in said first section.

7. The adjustable squaring tool of claim 6, further comprising:
   said measurement arm having a second plurality of angle indicators on a second face of said measurement arm, said second face being opposite said first face;
   said second section having a window portion positioned in alignment with said channel in said main member whereby said second plurality of angle indicators are visible through said window portion in said second section.

8. The adjustable squaring tool of claim 1, further comprising:

said main member having a pair of locking apertures positioned adjacent an interior drum chamber of said main member;

said drum having a pair of threaded extensions extending from opposite ends of said drum, each of said threaded extensions passing through an associated one of said locking apertures; and said locking assembly having a locking nut couplable to one of said threaded extensions and a thumbscrew couplable to another one of said threaded extensions, said thumb screw being tightenable to compress said main member between said thumb screw and said locking nut whereby said measurement arm is frictionally held in a static position relative to said main member when said thumb screw is tightened.

9. The adjustable squaring tool of claim 6, further comprising:

said pivot arm having a leading edge, said leading edge being aligned with a center of said cylinder.

10. The adjustable squaring tool of claim 9, further comprising:

said first angle indicators being radially spaced corresponding to one degree increments around said center of said cylinder.

11. The adjustable squaring tool of claim 7, further comprising:

said pivot arm having a leading edge, said leading edge being aligned with a center of said cylinder; and said first angle indicators being radially spaced corresponding to one degree increments around said center of said cylinder; said second angle indicators being radially spaced corresponding to one degree increments around said center of said cylinder.

12. The adjustable squaring tool of claim 9, further comprising:

said window portion of said first section having alignment indicia extending along a longitudinal axis of said main member, said longitudinal axis of said main member extending through a center of said cylinder, whereby said angle indicator visible through said window portion and aligned with said alignment indicia indicates an angle between said leading edge of said pivot arm and said longitudinal axis of said main member.

13. The adjustable squaring tool of claim 6, wherein said window portion of said first section magnifies said angle indicators for facilitating reading of a measurement of said squaring tool.

14. An adjustable squaring tool, comprising:

a pivot arm assembly having an elongated pivot arm and a cylinder coupled to an end of the pivot arm, the cylinder having a plurality of apertures radially spaced in five degree increments;

a main member, the pivot arm being pivotally coupled between a first section and a second section of the main member;

a graduated arcuate measurement arm extending from the pivot arm, the measurement arm extending through a channel in the main member;

a drum assembly having a drum passing through the cylinder of the pivot arm, the drum assembly having at least one spring biased bearing extending outwardly from said drum, said bearings being positioned for engaging a selectable one of said apertures in the cylinder corresponding to a selectable angle between said pivot arm and said main member;

a locking assembly for clamping the pivot arm between the first and second sections of the main member to prevent movement of the pivot arm relative to the main member;

said apertures in said cylinder being arranged into a plurality of rows, said apertures in each row being radially spaced with respect to each other;

said drum assembly having a plurality of said spring biased bearings, each bearing being positioned to engage a selectable one of said apertures in an associated one of said rows of apertures;

said cylinder having three rows of apertures and said drum assembly having three spring loaded bearing members;

said first section of said main member having a plurality of first section connection holes;

said second section of said main member having a plurality of second section connection holes, said second section connection holes being positioned to align with said first section connection holes to form a plurality of main member holes extending through the main member;

a plurality of connecting members, each of said connecting members being insertable through an associated one of said main member holes for coupling said first section to said second section such that said measurement arm is permitted to rotate relative to said main member;

said first and second sections of said main member each having complimentary measurement arm channels, said measurement arm channels being positioned adjacent to each other when said first section is coupled to said second section to form said channel through said main member;

said measurement arm having a first plurality of angle indicators on a first face of said measurement arm;

said first section having a window portion positioned in alignment with said channel in said main member whereby said first plurality of angle indicators are visible through said window portion in said first section;

said measurement arm having a second plurality of angle indicators on a second face of said measurement arm, said second face being opposite said first face;

said second section having a window portion positioned in alignment with said channel in said main member whereby said second plurality of angle indicators are visible through said window portion in said second section;

said main member having a pair of locking apertures positioned adjacent an interior drum chamber of said main member;

said drum having a pair of threaded extensions extending from opposite ends of said drum, each of said threaded extensions passing through an associated one of said locking apertures;

said locking assembly having a locking nut couplable to one of said threaded extensions and a thumbscrew couplable to another one of said threaded extensions, said thumb screw being tightenable to compress said main member between said thumb screw and said locking nut whereby said measurement arm is frictionally held in a static position relative to said main member when said thumb screw is tightened;

said pivot arm having a leading edge, said leading edge being aligned with a center of said cylinder;

said first angle indicators being radially spaced corresponding to one degree increments around said center of said cylinder;

said second angle indicators being radially spaced corresponding to one degree increments around said center of said cylinder;

said window portion of said first section having alignment indicia extending along a longitudinal axis of said main member, said longitudinal axis of said main member extending through a center of said cylinder, whereby said angle indicator visible through said window portion and aligned with said alignment indicia indicates an angle between said leading edge of said pivot arm and said longitudinal axis of said main member; and wherein said window portion of said first section magnifies said angle indicators for facilitating reading of a measurement of said squaring tool.

* * * * *